United States Patent
Worrall et al.

(10) Patent No.: US 10,299,177 B2
(45) Date of Patent: May 21, 2019

(54) IN-SEQUENCE DELIVERY OF UPSTREAM USER TRAFFIC DURING HANDOVER

(75) Inventors: Chandrika Worrall, Newbury (GB); Sudeep Palat, Swindon (GB)

(73) Assignee: Alcatel Lucent, Nozay (FR)

(*) Notice: Subject to any disclaimer, the term of this patent is extended or adjusted under 35 U.S.C. 154(b) by 563 days.

(21) Appl. No.: 13/878,781

(22) PCT Filed: Oct. 11, 2011

(86) PCT No.: PCT/EP2011/067687
§ 371 (c)(1),
(2), (4) Date: Apr. 11, 2013

(87) PCT Pub. No.: WO2012/049149
PCT Pub. Date: Apr. 19, 2012

(65) Prior Publication Data
US 2013/0215822 A1 Aug. 22, 2013

(30) Foreign Application Priority Data
Oct. 13, 2010 (EP) .................................... 10306111

(51) Int. Cl.
*H04W 36/02* (2009.01)
*H04L 12/801* (2013.01)

(52) U.S. Cl.
CPC ............. *H04W 36/02* (2013.01); *H04L 47/34* (2013.01)

(58) Field of Classification Search
None
See application file for complete search history.

(56) References Cited

U.S. PATENT DOCUMENTS

| | | | |
|---|---|---|---|
| 2008/0310367 A1* | 12/2008 | Meylan | H04W 36/02 370/331 |
| 2009/0034476 A1* | 2/2009 | Wang | H04W 28/06 370/331 |

(Continued)

FOREIGN PATENT DOCUMENTS

| | | |
|---|---|---|
| CN | 101374325 A | 2/2009 |
| CN | 101374326 A | 2/2009 |

(Continued)

OTHER PUBLICATIONS

"$3^{rd}$ Generation Partnership Project; Technical Specification Group Radio Access Network; Evolved Universal Terrestrial Radio Access (E-UTRA); Relay architectures for E-UTRA (LTE-Advanced) (Release)," 3GPP TR 36.806, V2.0.0, XP050450793, pp. 1-34, Feb. 2010.

(Continued)

*Primary Examiner* — Christopher T Wyllie
(74) *Attorney, Agent, or Firm* — Fay Sharpe LLP (57) ABSTRACT

The present invention relates to a donor radio access node (DeNB1) configured to wirelessly connect to, and to proxy operation of a source relay node (RN1), and further configured to forward upstream user traffic towards a serving gateway (S-GW1) during a handover of a particular mobile device (UE1) from a source cell (A) operated by the source relay node to a target cell (C) operated by a target radio access node (eNB2). In accordance with an embodiment of the invention, the donor radio access node comprises: —first forwarding means (FW1) for forwarding a sequence of upstream data packets (P1, P2, P3) from the source relay node to the serving gateway, which sequence of upstream data packets comprising upstream data packets up to a particular packet sequence number (Y−1), —second forwarding means (FW2) for forwarding a data transfer status message (SN STATUS TRANSFER) for the particular (Continued)

mobile device from the source relay node to the target radio access node, which data transfer status message comprising an information element (Y) indicative of the particular packet sequence number, wherein the donor radio access node comprises a forwarding controller (CTRL) coupled to the first and second forwarding means, and configured to interdependently control forwarding of the data transfer status message and of any pending upstream data packet (P2, P3) out of the sequence of upstream data packets that has not been yet validly forwarded to the serving gateway. The present invention also relates to a method for forwarding upstream user traffic towards a serving gateway during a handover.

6 Claims, 6 Drawing Sheets

(56) References Cited

U.S. PATENT DOCUMENTS

| | | | |
|---|---|---|---|
| 2009/0086677 A1* | 4/2009 | Ho | H04W 36/02 370/331 |
| 2009/0103478 A1* | 4/2009 | Sammour | H04L 1/1874 370/328 |
| 2010/0195617 A1* | 8/2010 | Park | H04W 36/02 370/331 |
| 2010/0303039 A1* | 12/2010 | Zhang | H04L 5/0035 370/331 |
| 2010/0322197 A1* | 12/2010 | Adjakple | H04B 7/155 370/332 |
| 2011/0002304 A1* | 1/2011 | Lee | H04W 36/02 370/331 |
| 2011/0013593 A1* | 1/2011 | Hapsari | H04W 36/02 370/331 |
| 2012/0218970 A1* | 8/2012 | Westberg | H04W 36/026 370/331 |

FOREIGN PATENT DOCUMENTS

| | | |
|---|---|---|
| CN | 101730032 | 6/2010 |
| WO | WO 2009/099170 A1 | 8/2009 |

OTHER PUBLICATIONS

International Search Report for PCT/EP2011/067687 dated Nov. 3, 2011.

* cited by examiner

IN-SEQUENCE DELIVERY OF UPSTREAM USER TRAFFIC DURING HANDOVER

TECHNICAL FIELD OF THE INVENTION

The present invention relates to in-sequence delivery of upstream user traffic during a handover procedure.

TECHNICAL BACKGROUND OF THE INVENTION

Handover is the process of transferring an ongoing communication session, being a voice/video call or a data session, from the current serving cell, further referred to as the source cell, towards a new better-suited cell, further referred to as the target cell. For instance, as a User Equipment (UE) is moving away from the coverage area of a serving cell, the radio signal from that serving cell weakens while the radio signal from another better-suited cell strengthens. When the radio path loss between these two cells is past a predetermined threshold, a handover towards the better-suited cell is triggered. A UE may also be handed over on account of Radio Resource Management (RRM) criterion, for instance because the serving cell gets overloaded.

For Long Term Evolution (LTE) mobile networks, an overview of the handover procedure and related message exchanges is described in § 10.1.2 of the Technical Specification (TS) entitled "*Evolved Universal Terrestrial Radio Access (E-UTRA) and Evolved Universal Terrestrial Radio Access Network (E-UTRAN); Overall description*", published by the 3rd Generation Partnership Project (3GPP) in June 2009, ref. 3GPP TS 36.300 V9.0.0.

In a first step, the source evolved-NodeB (eNB) configures the UE measurement policy, e.g. the UE is configured to send MEASUREMENT REPORT on a regular basis and/or as soon as a handover event is detected. The measurement reporting period and/or the handover parameters for detecting the handover events are broadcast by the serving cell as part of the system cell information.

In a second step, the source eNB makes a decision to hand off the UE based on the MEASUREMENT REPORT message(s) received from the UE and/or on Radio Resource Management (RRM) criterion. The source eNB either issues a HANDOVER REQUEST message directly to the target eNB, or a HANDOVER REQUIRED message to the Mobile Management Entity (MME) which is relayed towards the target eNB as a HANDOVER REQUEST message, passing necessary information to prepare the handover at the target side.

In a third step, the target eNB configures the required radio resources, and optionally reserves a Random Access CHannel (RACH) preamble. The target eNB acknowledges the handover request by either sending back a HANDOVER REQUEST ACKNOWLEDGE message directly to the source eNB, or a HANDOVER REQUEST ACKNOWLEDGE message to the MME which is relayed towards the source eNB as a HANDOVER COMMAND message. The HANDOVER REQUEST ACKNOWLEDGE or the HANDOVER COMMAND message includes an RRC container, namely an RRC CONNECTION RECONFIGURATION message, to be transparently passed by the source eNB to the UE.

In a fourth step, the UE receives the RRC CONNECTION RECONFIGURATION message with necessary parameters to switch to the target cell. The UE performs synchronization to the target eNB and accesses the target cell via RACH, following a contention-free procedure if a dedicated RACH preamble was reserved, or following a contention-based procedure if no dedicated preamble was indicated.

In a fifth step, the target eNB responds with uplink allocation and timing advance value. When the UE has successfully accessed the target cell, the UE sends the RRC CONNECTION RECONFIGURATION COMPLETE message to the target eNB. The target eNB can now begin sending data to the UE.

In a sixth and last step, the target eNB informs the source eNB about the success of the handover procedure by sending a UE CONTEXT RELEASE message, which triggers the release of resources by the source eNB.

The data plane (or user plane) handling takes the following principles into account to avoid data loss during handover.

During handover preparation, tunnels can be established between the source eNB and the target eNB. For each Evolved-Radio Access Bearer (E-RAB) for which data forwarding is applied, one tunnel is established for upstream data forwarding and another tunnel is established for downstream data forwarding.

During handover execution, user traffic can be forwarded from the source eNB to the target eNB.

Upon handover completion, the target eNB sends a PATH SWITCH message to the MME to inform the MME that the UE has gained access to the target cell. The MME sends a USER PLANE UPDATE REQUEST message to the Serving-GateWay (S-GW), and the downstream data plane is switched by the S-GW from the source eNB to the target eNB.

In-sequence delivery and duplicate avoidance of data traffic is important to guarantee the effective operation of the transport protocol, such as the Transport Control Protocol (TCP) used over the Internet. In E-UTRAN, in-sequence delivery and duplicate avoidance function is guaranteed by the Packet Data Convergence Protocol (PDCP) layer. For in-sequence delivery and duplicate avoidance, a PDCP Sequence Number (SN) is maintained on a per bearer basis.

The source eNB sends the SN STATUS TRANSFER message to the target eNB to convey the upstream PDCP Sequence Number (SN) receiver status and the downstream PDCP SN transmitter status of E-RABs for which PDCP status preservation applies, i.e. for Radio Link Control—Acknowledged Mode (RLC-AM) transmission. The upstream PDCP SN receiver status includes the PDCP SN of the first missing upstream data packet, and may include a bit map of the receive status of the out of sequence upstream data packets that the UE needs to retransmit in the target cell. The downstream PDCP SN transmitter status indicates the next PDCP SN that the target eNB shall assign to new downstream data packets not having a PDCP SN yet. The source eNB may omit sending the SN STATUS TRANSFER message if none of the E-RABs of the UE shall be treated with PDCP status preservation.

During handover execution, the source eNB forwards in order to the target eNB all downlink PDCP Service Data Units (SDU) with their SN that have not been acknowledged by the UE. In addition, the source eNB also forwards without a PDCP SN fresh data arriving from the S-GW to the target eNB.

The source eNB forwards to the S-GW the upstream PDCP SDUs successfully received in-sequence until the sending of the SN STATUS TRANSFER message to the target eNB. Then at that point of time the source eNB stops delivering upstream PDCP SDUs to the S-GW and shall discard any remaining upstream RLC Protocol data Unit (PDU).

The source eNB shall either discard the upstream PDCP SDUs received out of sequence if the source eNB has not accepted the request from the target eNB for upstream forwarding or if the target eNB has not requested upstream forwarding for the bearer during the handover preparation procedure, or shall forward to the target eNB the upstream PDCP SDUs received out of sequence if the source eNB has accepted the request from the target eNB for upstream forwarding for the bearer during the handover preparation procedure.

The target eNB first re-transmits downstream PDCP SDUs forwarded by the source eNB through X2 before sending fresh data from the S-GW, with the exception of PDCP SDUs of which the reception was already acknowledged by the UE.

In order to assist the reordering function in the target eNB, the S-GW shall send one or more end-marker downstream packets on the old path immediately after switching the path. The end-marker packets shall not contain user data.

Upon receipt of the RRC CONNECTION RECONFIGURATION COMPLETE message, the target eNB starts transmitting upstream data packets received in sequence to the S-GW from the SN indicated in the SN TRANSFER STATUS message.

Release 10 of 3GPP has introduced Relay Nodes (RN) for extending the radio coverage to (mostly rural) areas where backhauling infrastructure are non-existent or deficient. E-UTRAN supports radio nodes relaying by having an RN wirelessly connect to an eNB serving the RN, called Donor eNB (DeNB), via a modified version of the E-UTRA radio interface, the modified version being called the Un interface.

The RN supports the eNB functionality, meaning it terminates the radio protocols of the E-UTRA radio interface and the S1 and X2 interfaces.

In addition to the eNB functionality, the RN also supports a subset of the UE functionality so as to wirelessly connect to the DeNB.

The DeNB provides S1 and X2 proxy functionality between the RN and other network nodes (i.e., eNBs, MMES and S-GWs). S1 and X2 proxy functionality includes passing S1 and X2 data and control packets between S1 and X2 interfaces associated with the RN and S1 and X2 interfaces associated with other network nodes. Therefore, the DeNB appears to the RN as an MME or an S-GW for S1 interface, or as an eNB for X2 interface.

The PDCP layer at the RN performs in-sequence delivery and duplicate avoidance functions for upstream traffic received from the UE. The RN wirelessly connects to the DeNB, hence the PDCP layer at the DeNB also performs in-sequence delivery and duplicate avoidance functions for upstream traffic received from the RN.

During handover execution, the RN generates the SN STATUS TRANSFER message based on the last PDCP PDU received in sequence over the Uu interface. The PDCP SDU received in-sequence are placed in the transmission buffer for further transmission over the Un interface to the DeNB. From the RN point of view, the data in the transmission buffer are assumed to be delivered to the S-GW. Over the Un interface, the data may require Automatic Repeat reQuest (ARQ) retransmission for correct delivery to the DeNB due to impairments over the radio channel. Even if the RN stops transmitting upstream data packets after issuing the SN STATUS TRANSFER message, the DeNB does not stop the delivery of upstream data packets to the S-GW. After successful handover, the target eNB transmits upstream data packets that are received in sequence to the S-GW. Meanwhile, the DeNB may also deliver any pending upstream data packets to the S-GW. Therefore, it is possible for the S-GW to receive upstream data packets from the DeNB and the target eNB at the same time, or the upstream data packets delivered from the target eNB may arrive at the S-GW prior to the arrival of upstream data packets from the DeNB. This results in upstream data packets arriving at the S-GW out of sequence, which in turn may severely impact data transport on account of e.g. TCP congestion avoidance algorithm.

SUMMARY OF THE INVENTION

It is an object of the present invention to improve upstream user traffic forwarding during outgoing handover from a serving cell operated by a RN.

In accordance with a first aspect of the invention, a donor radio access node is configured to wirelessly connect to, and to proxy operation of, a source relay node, and is further configured to forward upstream user traffic towards a serving gateway during a handover of a particular mobile device from a source cell operated by said source relay node to a target cell operated by a target radio access node.

Said donor radio access node comprises:
  first forwarding means for forwarding a sequence of upstream data packets from said source relay node to said serving gateway, which sequence of upstream data packets comprising upstream data packets up to a particular packet sequence number,
  second forwarding means for forwarding a data transfer status message for said particular mobile device from said source relay node to said target radio access node, which data transfer status message comprising an information element indicative of said particular packet sequence number,
wherein said donor radio access node comprises a forwarding controller coupled to said first and second forwarding means, and configured to interdependently control forwarding of said data transfer status message and of any pending upstream data packet out of said sequence of upstream data packets that has not been yet validly forwarded to said serving gateway.

In accordance with another aspect of the invention, a method for forwarding upstream user traffic towards a serving gateway during a handover of a particular mobile device from a source cell operated by a source relay node to a target cell operated by a target radio access node, comprises the steps of, by a donor radio access node configured to wirelessly connect to, and to proxy operation of, said source relay node:
  forwarding a sequence of upstream data packets from said source relay node to said serving gateway, which sequence of upstream data packets comprising upstream data packets up to a particular packet sequence number,
  forwarding a data transfer status message for said particular mobile device from said source relay node to said target radio access node, which data transfer status message comprising an information element indicative of said particular packet sequence number,
wherein said method further comprises the steps of, by said donor radio access node, interdependently controlling forwarding of said data transfer status message and of any pending upstream data packet out of said sequence of upstream data packets that has not been yet validly forwarded to said serving gateway.

As the DeNB is configured to proxy the X2 signalling between the RN and the target eNB, it can easily intercept the SN STATUS TRANSFER message issued by the source RN. The SN STATUS TRANSFER message comprises the SN of the first missing PDCP PDU over the Uu uplink.

Concurrently, the DeNB forwards any PDCP SDU received in sequence from the RN to the S-GW. Yet, the PDCP SN used over the Un interface may be different from the PDCP SN assigned over the Uu interface.

According to the agreed protocol architecture, a GTP-U tunnel is established between the RN and the DeNB, and therefore the RN can use the GTP-U extension mechanism to indicate the PDCP SN used over the Uu interface for each forwarded PDCP SDU. The PDCP SN of the forwarded SDUs is carried in the PDCP PDU NUMBER field of the GTP-U extension header.

Hence, the DeNB has enough information for identifying any pending upstream data packet, and can appropriately control the forwarding of the SN STATUS TRANSFER message and/or the pending upstream data packets for in-sequence delivery of upstream user traffic to the S-GW.

In one embodiment of a donor radio access node according to the invention, said second forwarding means is further configured to delay forwarding of said data transfer status message to said target radio access node till said pending upstream data packet has been validly forwarded to said serving gateway.

In a corresponding embodiment of a method according to the invention, said method further comprises the step of, by said donor radio access node, delaying forwarding of said data transfer status message to said target radio access node till said pending upstream data packet has been validly forwarded to said serving gateway.

In order to guarantee the in-sequence delivery of upstream user traffic to the S-GW, the DeNB delays the SN STATUS TRANSFER message delivery to the target eNB until all the ongoing transmission/re-transmission complete over the Un interface, and until all the pending upstream data packets have been validly forwarded to the S-GW.

In one embodiment of a donor radio access node according to the invention, said second forwarding means is further configured to delay forwarding of said data transfer status message towards said target radio access node by a pre-determined period of time, and to stop forwarding of said pending upstream data packet to said serving gateway after said pre-determined period of time has expired.

In a corresponding embodiment of a method according to the invention, said method further comprises the steps of, by said donor radio access node:
  delaying forwarding of said data transfer status message towards said target radio access node by a pre-determined period of time, and
  stopping forwarding of said pending upstream data packet to said serving gateway after said pre-determined period of time has expired.

The DeNB delays the forwarding of the SN STATUS TRANSFER message to the target eNB by a pre-configured period of time. When the SN STATUS TRANSFER message is eventually sent to the target eNB, the DeNB stops forwarding any upstream traffic to the S-GW. The time to delay the forwarding of the SN STATUS TRANSFER message is a function of the network and may be pre-configured for a given deployment. This mechanism, although simple to implement, may yield packet loss due to the forced stop of upstream data transmission towards the S-GW.

In one embodiment of a donor radio access node according to the invention, said first forwarding means is further configured to redirect said pending upstream data packet to said target radio access node after said data transfer status message has been validly forwarded to said target radio access node.

In a corresponding embodiment of a method according to the invention, said method further comprises the step of, by said donor radio access node, redirecting said pending upstream data packet to said target radio access node after said data transfer status message has been validly forwarded to said target radio access node.

After the SN STATUS TRANSFER message is transmitted to the target eNB, the DeNB stops the transmission of any pending upstream data packets for the corresponding UE to the S-GW. Instead, the pending upstream data packets are redirected to the target eNB.

Upstream data packets forwarded by the DeNB arrives at the target eNB. As the PDCP SN corresponding to the Uu interface transmission is conveyed together with the forwarded data, there is sufficient information for in-sequence delivery of upstream data packets to the S-GW by the target eNB.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
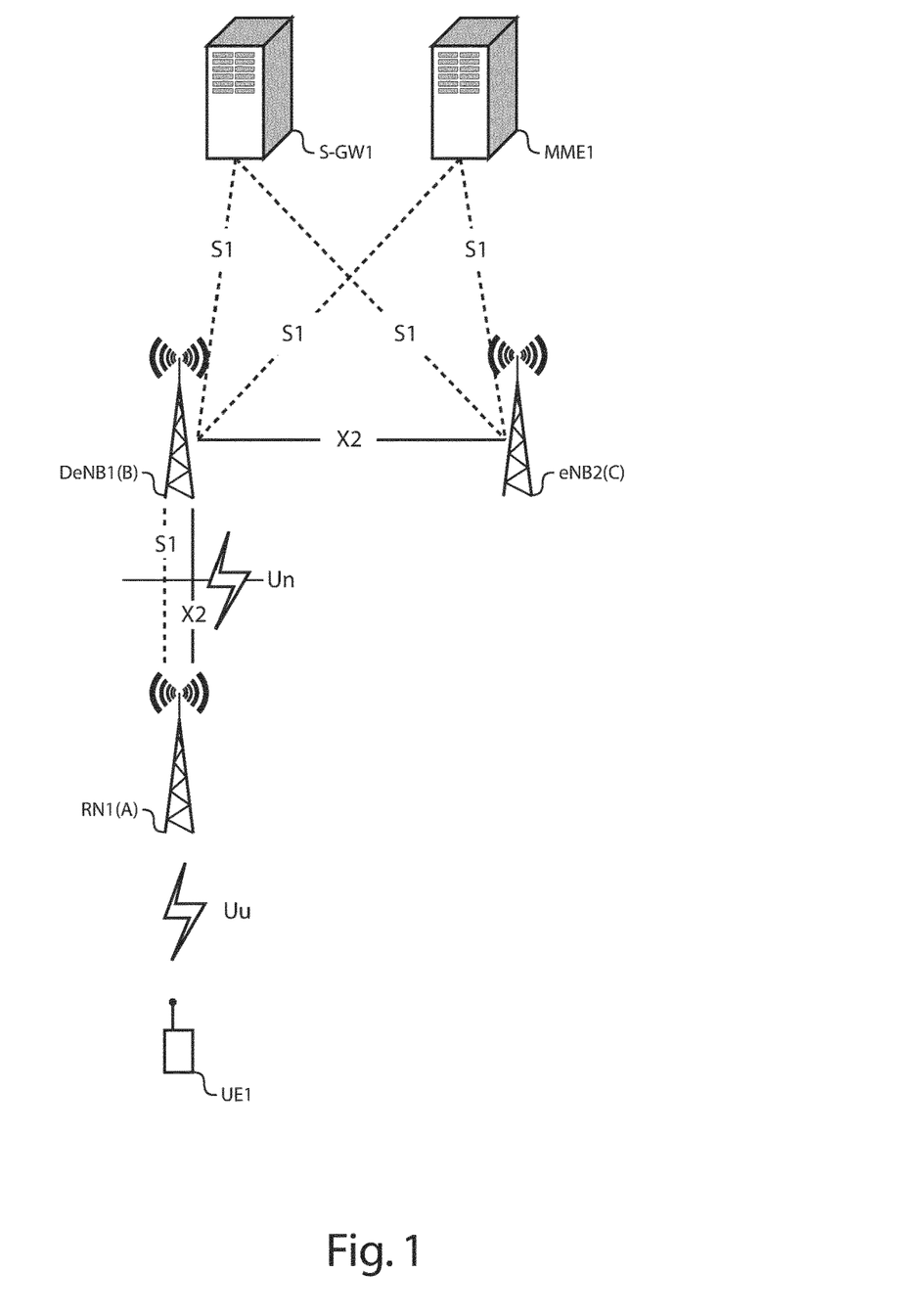
FIG. 1 represents part of an LTE mobile infrastructure.

There is seen in FIG. 1 part of an LTE Public Land Mobile Network (PLMN) comprising the following network nodes:
  an MME MME1,
  a S-GW S-GW1,
  3 eNBs RN1, DeNB1 and eNB2,
  a UE UE1, such as a mobile terminal.

The eNBs DeNB1 and eNB2 are directly coupled to the MME MME1 and to the S-GW S-GW1 through an S1 interface. The eNB DeNB1 is a DeNB that wirelessly connects (via Un interface) the RN RN1 to the Evolved Packet Core (EPC). The DeNB DeNB1 acts as an S1 proxy for S1 connections between the RN RN1 and the MME MME1 and the S-GW S-GW1, and as an X2 proxy for X2 connections between the RN RN1 and further eNBs.

Figure 2:
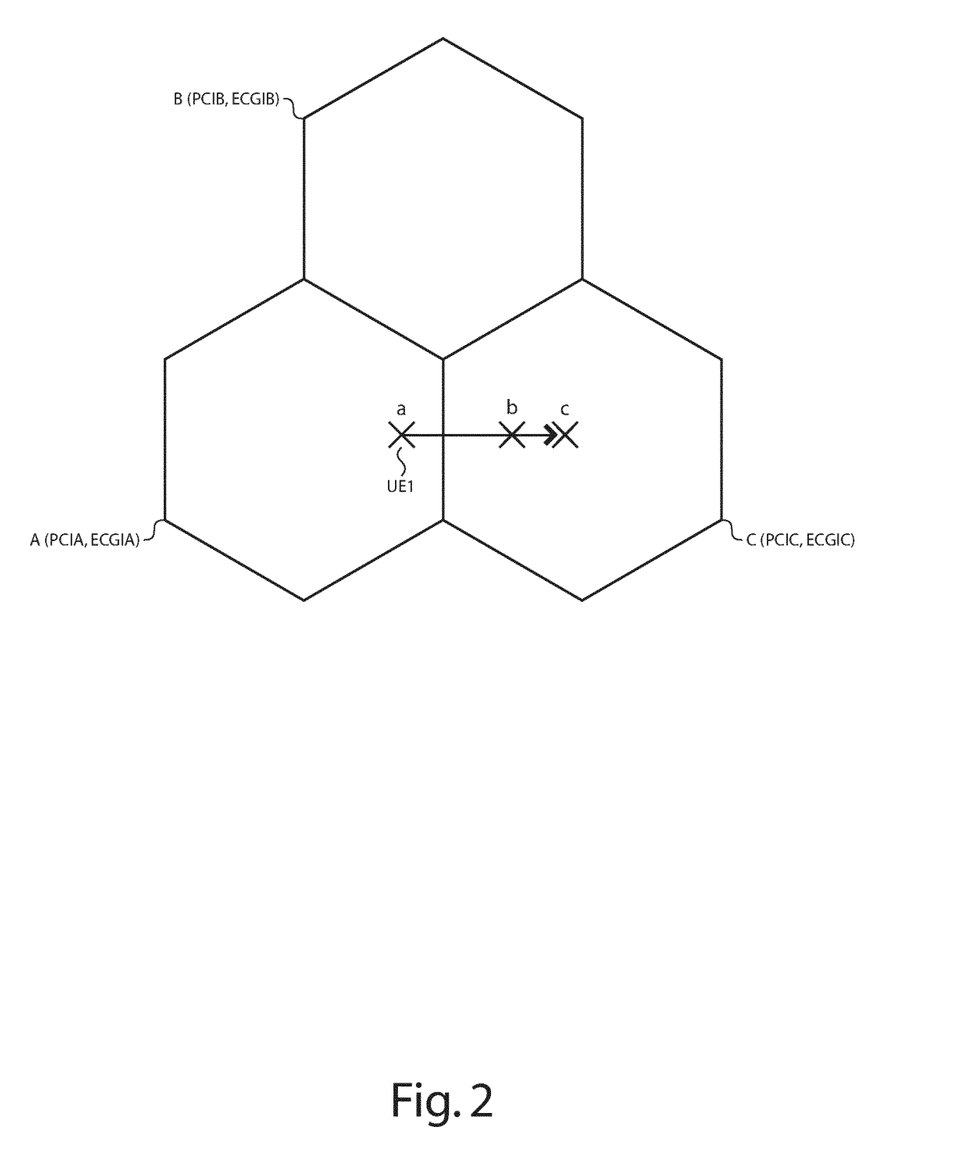
FIG. 2 represents a coverage area.

There is seen in FIG. 2 a radio coverage area comprising 3 cells A, B and C respectively operated by the eNBs RN1, DeNB1 and eNB2.

The 3 cells A, B and C are assumed to belong to the same Tracking Area (TA), and have PCIA, PCIB and PCIC as Physical Cell Identifiers (PCI), and further have ECGIA, ECGIB and ECGIC as Evolved Cell Global Identifiers.

The UE UE1 establishes a communication session at position a within the coverage area of the cell A, further referred to as the source cell.

The UE UE1 next moves towards position c while the communication session is on-going.

At position b, the radio signal from cell C incurs a lower path loss than the radio signal from cell A. Provided the difference between the respective path losses is beyond some configured handover margin, an handover is triggered for handing over the on-going session towards the cell C, further referred to as the target cell. Other handover causes can be invoked too.

Figure 3:
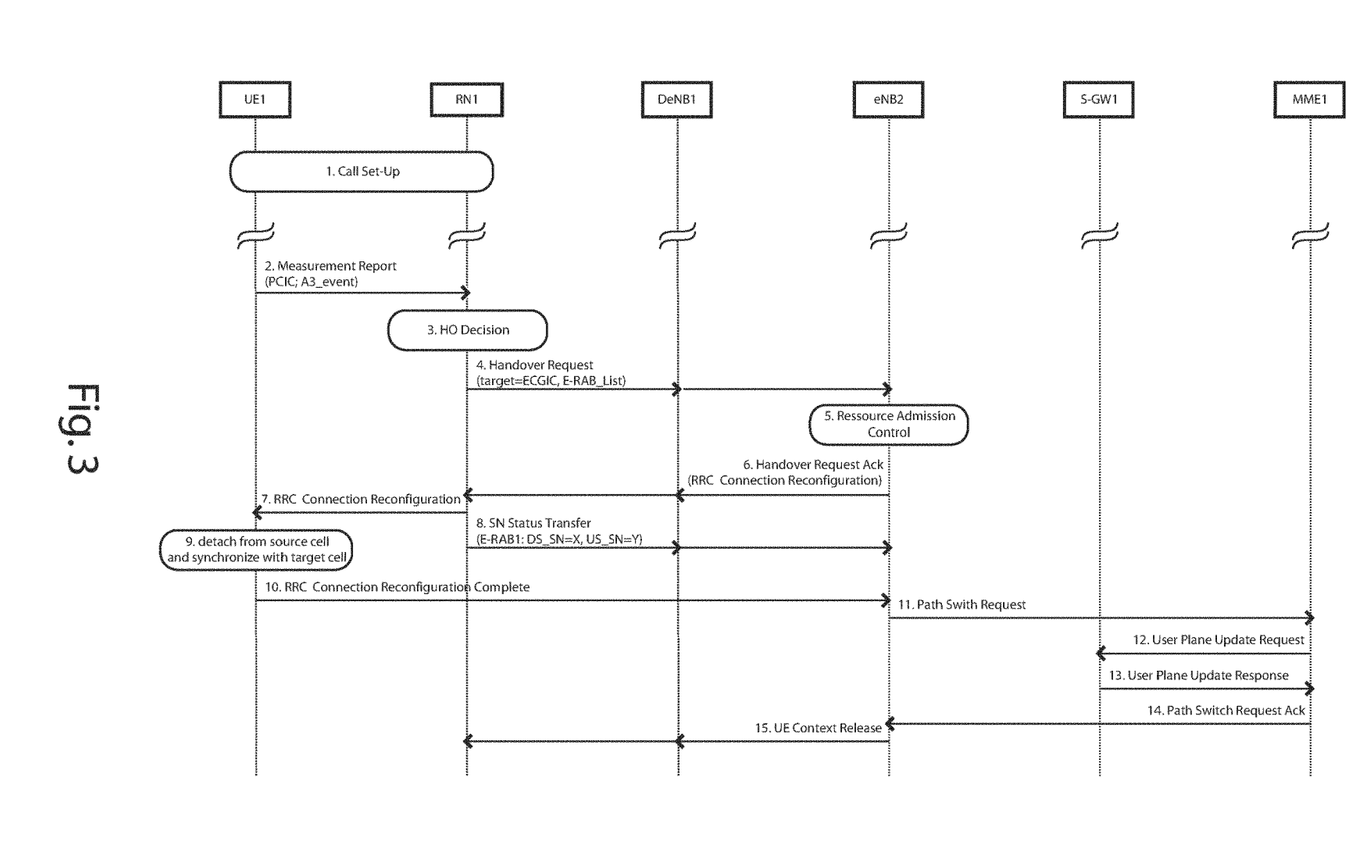
FIG. 3 represents signaling exchanges (control plane) between various network elements during an handover procedure.

There is seen in FIG. 3 a message flow chart representing the most noticeable signaling exchanges during the handover procedure.

First, the UE UE1 initiates communication with the source RN RN1, and establishes one or more E-RABs with the EPC (see step 1 in FIG. 3). It is further assumed that PDCP status preservation applies for these E-RABs.

As part of the call setup procedure, the UE UE1 is configured with a measurement policy and handover thresholds. The UE UE1 measures the signal strength and quality from neighboring cells, and compares them with the respective handover thresholds.

In a further step, as the UE UE1 leaves the cell A operated by the RN RN1 and enters the cell C operated by the eNB eNB2, a MEASUREMENT REPORT message is sent to the source RN RN1 for notifying a handover event towards the target cell C (see step 2 in FIG. 3). The MEASUREMENT REPORT message comprises the PCI of the target cell, presently PCIC, and the type of handover event, presently an A3 event (neighbor becomes offset better than serving).

Thereupon, the source RN RN1 makes a decision to perform a handover for the UE UE1 from the source cell A towards the target cell C (see step 3 in FIG. 3).

The source RN RN1 reads the ECGI of the corresponding cell from a local data repository wherein PCI and ECGI are held in one-to-one relationships, and sends a HANDOVER REQUEST message to the target eNB eNB2, which message being X2-proxied by the DeNB DeNB1 (see step 4 in FIG. 3). The HANDOVER REQUEST message comprises ECGIC as target cell identity, as well as the list of E-RABS to set up at the target side.

Upon receipt of the HANDOVER REQUEST message, and after resource admission control (see step 5 in FIG. 3), the target eNB eNB2 sends back a HANDOVER REQUEST ACK message to the source RN RN1, which message being X2-proxied by the DeNB DeNB1 (see step 6 in FIG. 3). The HANDOVER REQUEST ACK message includes an RRC CONNECTION RECONFIGURATION container to be passed transparently by the source RN RN1 to the UE UE1.

At that point of time, the source RN RN1 issues a SN STATUS TRANSFER message to be X2-proxied by the DeNB DeNB1 towards the target eNB eNB2 (see step 8 in FIG. 3). The SN STATUS TRANSFER message comprises, for each E-RAB for which PDCP status preservation applies, the next downstream PDCP SN that shall be assigned by the target eNB to the first downstream data packet not having a PDCP SN yet, presently X for E-RAB1, and the first missing upstream PDCP SN, presently Y for E-RAB1.

Meanwhile, the UE UE1 receives the RRC CONNECTION RECONFIGURATION message with necessary parameters, and is thus commanded by the source RN RN1 to perform the handover (see step 7 in FIG. 3). The UE UE1 detaches from the current serving cell A and performs synchronization to the target cell C via RACH. The target eNB eNB2 responds with uplink allocation and timing advance value (see step 9 in FIG. 3). When the UE UE1 has successfully accessed the target cell C, the UE UE1 sends an RRC CONNECTION RECONFIGURATION COMPLETE message to the target eNB eNB2 (see step 10 in FIG. 3).

To complete the handover procedure, the target eNB eNB2 sends a PATH SWITCH REQUEST message to the MME MME1 (see step 11 in FIG. 3). The PATH SWITCH REQUEST message is relayed by the MME MME1 as a USER PLANE UPDATE REQUEST message to the S-GW S-GW1 (see step 12 in FIG. 3).

Thereupon, the S-GW S-GW1 switches the downstream data plane from the source RN RN1 towards the target eNB eNB2, and answers with a USER PLANE UPDATE RESPONSE to the MME MME1 (see step 13 in FIG. 3) to be relayed as a PATH SWITCH REQUEST ACK message towards the target eNB eNB2 (see step 14 in FIG. 3).

The handover procedure terminates with a UE CONTEXT RELEASE message issued by the target eNB eNB2 towards the source RN RN1 through the DeNB DeNB1 for releasing the corresponding E-RABs in the source cell (see step 15 in FIG. 3).

The source and target eNBs are shown as connected to the same MME, yet they may be connected to different MMEs, in which case the source eNB issues a HANDOVER REQUIRED message towards the target eNB including the eNB identity of the target eNB. The message is relayed by the source MME as a HANDOVER REQUEST message towards the target eNB through a further target MME. The target eNB then answers with a HANDOVER REQUEST ACK message, which is relayed by the target MME as a HANDOVER COMMAND message towards the source eNB.

Figure 4:
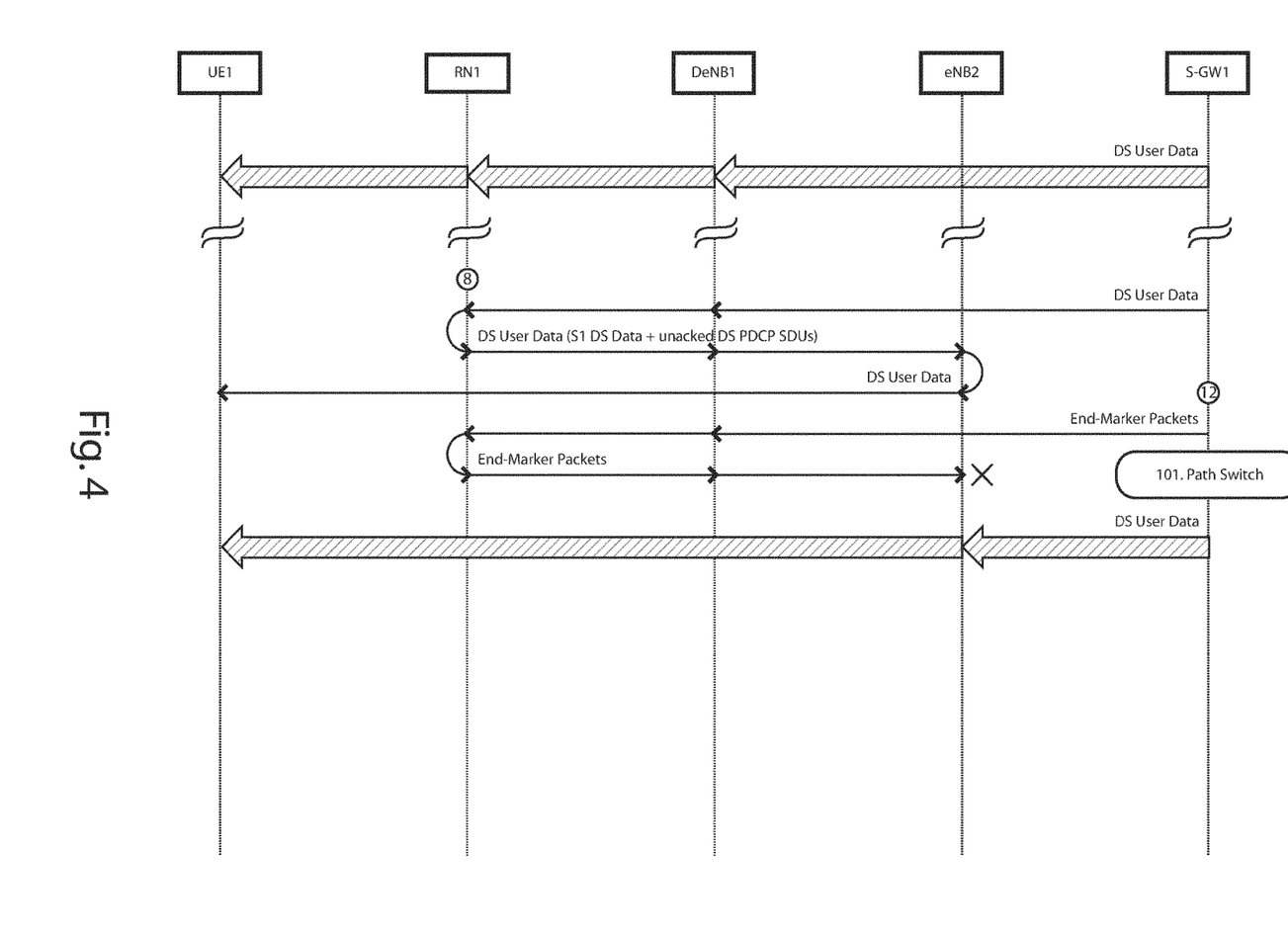
FIG. 4 represents downstream data exchanges (user plane) between various network elements during an handover procedure.

There is seen in FIG. 4 further details about downstream user traffic forwarding during the handover procedure. Encircled numbers refer to the signaling steps of FIG. 3.

After call setup in the serving cell A, downstream user data flows from the S-GW S-GW1 through the DeNB DeNB1 and the RN RN1 up to the UE UE1. For each E-RAB, a first GTP-U tunnel is established for conveying downstream user traffic from the S-GW S-GW1 to the DeNB DeNB1, and a second GTP-U tunnel is established for conveying downstream user traffic from the DeNB DeNB1 to the RN RN1. The DeNB DeNB1 maintains a cross-connect table for associating a tunnel identifier over the S1 interface with another tunnel identifier over the Un interface.

After issuing the RRC CONNECTION RECONFIGURATION message towards the UE UE1, the source RN RN1 stops forwarding downstream data packets towards the UE UE1 and issues the SN STATUS TRANSFER message (see step 8 in FIG. 3) with, for each E-RAB, the PDCP SN that shall be assigned by the target eNB eNB2 to the first downstream data packet not having a PDCP SN yet, presently PDCP SN X for E-RAB1.

The source RN RN1 re-tunnels any new data packet received through S1 from the S-GW S-GW1 back towards the target eNB eNB2. Those packets do not have any PDCP SN assigned yet, and shall be assigned a PDCP SN starting from X upwards.

The source RN RN1 also forwards downstream data packet that do have a PDCP SN assigned, yet that have not been acknowledged by the UE UE1. Those downstream data packets shall have a PDCP SN that is lower than X.

The target eNB eNB2 transmits those re-directed downstream packets to the UE1 after the UE1 connects to the target cell C.

Upon receipt of the USER PLANE UPDATE REQUEST message (see step 12 in FIG. 3), the S-GW S-GW1 switches the downstream data plane towards the target eNB eNB2 (see step 101 in FIG. 4) and transmits end-marker downstream data packets on the old path towards the source RN RN1. Those end-marker packets are re-tunneled by the source RN RN1 towards the target eNB eNB2 as the regular downstream data packets are. Upon receipt of end-marker packets, the target eNB eNB2 stops accepting data packets from the source RN RN1, and starts accepting downstream data packets from the S-GW S-GW1 for further transmission towards the UE UE1.

Figure 5:
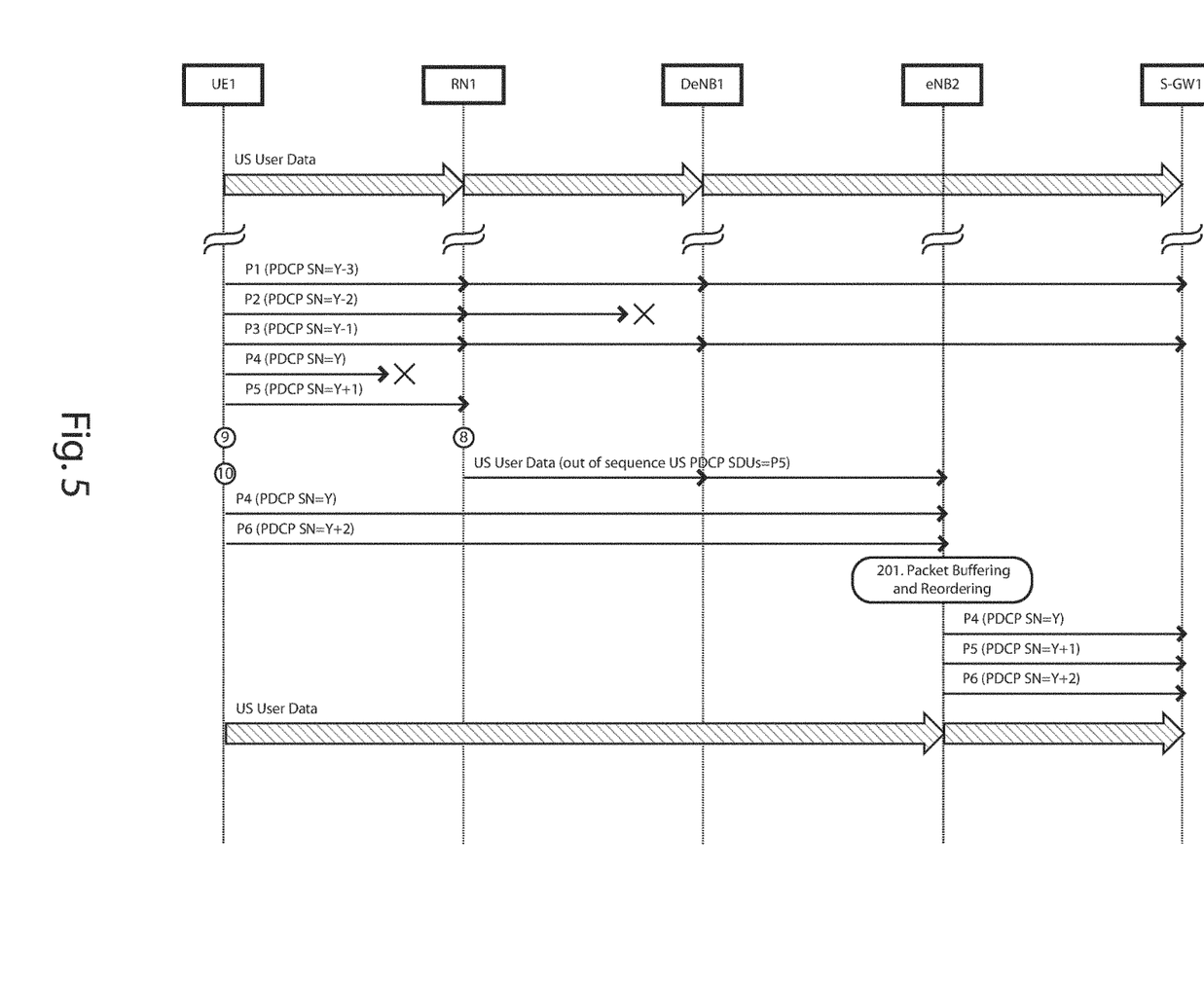
FIG. 5 represents upstream data exchanges (user plane) between various network elements during an handover procedure.

There is seen in FIG. 5 further details about upstream user traffic forwarding during the handover procedure. Again, encircled numbers refer to the signaling steps of FIG. 3.

After call setup in the serving cell A, upstream user data flows from the UE1 through the RN RN1 and the DeNB DeNB2 up to the S-GW S-GW1. For each E-RAB, a first GTP-U tunnel is established for conveying upstream user traffic from the RN RN1 to the DeNB DeNB1, and a second GTP-U tunnel is established for conveying upstream user traffic from the DeNB DeNB1 to the S-GW S-GW1. The DeNB DeNB1 maintains a cross-connect table for associating a tunnel identifier over the Un interface with another tunnel identifier over the S1 interface.

When the UE UE1 detaches from cell A (see step 9 in FIG. 3), the source RN RN1 issues a SN STATUS TRANSFER MESSAGE that comprises, for each E-RAB, the PDCP SN of the first upstream missing PDCP PDU, presently Y for E-RAB1 (see step 8 in FIG. 3). Upstream data packets P1, P2, P3, P4 and P5 with PDCP SN Y−3, Y−2, Y−1, Y and Y+1 respectively are shown as being the last upstream data packets transmitted by the UE UE1 over the Uu interface for E-RAB1. The upstream data packet P1, P2, P3 and P5 are validly received by the RN RN1, while the upstream data packet P4 is corrupted. As a consequence, the SN of the first upstream missing PDCP PDU as mentioned in the SN STATUS TRANSFER message is Y for E-RAB1.

While issuing the SN STATUS TRANSFER message, the RN RN1 places the PDCP payload of packets P1, P2 and P3 in the transmission buffer for further transmission through the Un interface to the DeNB DeNB1, which is seen as the S-GW S-GW1 by the RN RN1.

Additionally, the source RN RN1 tunnels any out-of-sequence PDCP SDU received from the UE UE1, presently the upstream data packet P5 with PDCP SN Y+1, towards the target eNB eNB2.

When the UE UE1 accesses the target cell C, it starts transmitting unacknowledged data packet P4 to the target eNB eNB2, as well as further upstream data packets P6, etc.

The target eNB eNB2 re-orders the upstream data packets (see step 201 in FIG. 5), and starts transmitting upstream user traffic in-sequence to the S-GW S-GW1 starting from packets P4 P5 P6 upwards.

Meanwhile, the upstream data packet P2 with PDCP SN Y−2 (over the Uu interface) is shown as being incorrectly received by the DeNB DeNB1, and thus needs re-transmission over the Un interface. Indeed, packet transmission over the wireless Un interface might be severely impaired on account of e.g. fading, radio interference, atmosphere absorption, etc. As a consequence, the upstream data packet P2 may arrive later at the S-GW S-GW1 than the data packets P4 and P5. As upstream data traffic is no longer received in-sequence, the transport protocol may be adversely affected.

As a first solution to this problem, the DeNB DeNB2 intercepts the SN STATUS TRANSFER message issued by the source RN RN1, and delays its forwarding towards the target eNB eNB2 by a pre-configured period of time. After this pre-configured period of time expires and the SN STATUS TRANSFER message is eventually forwarded to the target eNB eNB2, the DeNB DeNB1 will discard forwarding on any pending upstream PDCP SDU towards the S-GW S-GW1 for the corresponding E-RAB(s). Those pending upstream PDCP SDUs are easily identifiable and the DeNB need only disconnect the corresponding GTP-U tunnels in the cross-connect table for the corresponding E-RAB(s) after the pre-configured period of time has expired.

Alternatively, a timer may be pre-configured at both the DeNB DeNB1 and the target eNB eNB2, and started upon receipt of the SN STATUS TRANSFER message. The DeNB DeNB1 forwards the SN STATUS TRANSFER message to the target eNB eNB2 without delay. Upon timer expiry, the DeNB stops delivering any pending upstream data packet to the S-GW S-GW1. Similarly, the target eNB eNB2 does not transmit any upstream user traffic to the S-GW S-GW1 while the timer is running. Upon timer expiry, the target eNB eNB2 starts forwarding upstream user traffic to the S-GW S-GW1. This synchronous action by both the DeNB and the target eNB also guarantees in-sequence delivery of upstream user traffic to the S-GW.

As a second more elaborate solution to this problem, the DeNB DeNB1 can monitor the correct delivery of any pending upstream data packets to the S-GW S-GW1 over the S1 interface before forwarding the SN STATUS TRANSFER message to the target eNB eNB2. To do so, the DeNB DeNB1 intercepts the SN STATUS TRANSFER message from the source RN RN1 and, for each respective E-RAB, decodes the upstream PDCP SN mentioned therein, presently Y for E-RAB1. Then, the DeNB DeNB1 monitors the in-sequence delivery of any pending upstream data packets to the S-GW S-GW1 for the respective E-RAB(s) up to (not including) the mentioned PDCP SN, presently up to PDCP SN Y−1 for E-RAB1. This is possible because the PDCP SN used over the Uu interface is encoded into the PDCP PDU NUMBER field of the GTP-U extension header. When the last expected upstream data packet has been validly delivered to the S-GW S-GW1, presently P3 for E-RAB1, then the DeNB DeNB1 forwards the SN STATUS TRANSFER message to the target eNB eNB2.

This second solution can be advantageously coupled with the first solution, that is to say the DeNB DeNB1 can check whether any pending upstream data packet is still to be delivered to the S-GW S-GW1 for the corresponding E-RAB(s). Yet, if after a pre-configured period of time there are still any pending upstream data packet to be delivered to the S-GW S-GW1, then the DeNB DeNB1 sends the SN STATUS TRANSFER message anyhow to the target eNB eNB2 and discards the still pending upstream data packets for the corresponding E-RAB(s).

As a third solution to this problem, as soon as the DeNB DeNB1 forwards the SN STATUS TRANSFER message to the target eNB eNB2, the DeNB DeNB1 re-directs any pending upstream data packet for the respective E-RABs towards the target eNB eNB2. This can be achieved by updating the GTP-U cross-connect table so as to re-route the upstream data packets through another GTP tunnel directly towards the target eNB eNB2 (e.g., through the same tunnel used by the source RN RN1 to forward out-of-sequence upstream data packets to the target eNB eNB2). The upstream PDCP SN in the SN STATUS TRANSFER message can be updated according to the upstream data packets that have been effectively and validly delivered to the S-GW S-GW1, presently the upstream PDCP SN would be updated from Y to Y−2 for E-RAB1. The target eNB eNB2 shall re-order the upstream data packets before delivery to the S-GW S-GW1.

Alternatively, the DeNB DeNB1 may re-direct any pending upstream data packet back towards the RN RN1 for further forwarding towards the target enB eNB2 through the existing GTP-U tunnel that is used for tunneling out-of-sequence upstream upstream data packets.

Still alternatively, the target eNB eNB2 may, upon receipt of the RRC CONNECTION RECONFIGURATION COMPLETE message from the UE UE1, request the DeNB to stop transmitting upstream user traffic to the S-GW S-GW1 for the corresponding E-RAB(s) by means of a new X2 signaling message. Thereupon, the DeNB DeNB1 stops transmitting any pending upstream data packets for the corresponding E-RAB(s), and acknowledges the request. The target eNB eNB2 can now start sending upstream user traffic to the S-GW S-GW1.

The present invention might be slightly adapted to support in-sequence delivery of upstream user traffic during handover for RLC—Unacknowledged Mode (RLC-UM) transmission. Upon reception of the HANDOVER REQUEST ACK message from the target eNB eNB2 (see step 6 in FIG. 3), the DeNB DeNB1 keeps on delivering upstream user traffic to the S-GW S-GW1 for a pre-configured period of time. After the period of time has expired, the DeNB DeNB1 discards any pending upstream data packet received from the RN RN1 for the corresponding E-RAB(s).

Alternatively, and still for RLC-UM transmission, the RN RN1 may request the DeNB DeNB1 to stop delivery of upstream user traffic to the S-GW S-GW1. This request is sent to the DeNB DeNB1 upon transmission of the RRC CONNECTION RECONFIGURATION message to the UE UE1 (see step 7 in FIG. 3). The DeNB DeNB1 either stops delivering upstream traffic to the S-GW S-GW1, or starts a timer and delivers upstream user traffic to the S-GW S-GW1 till the timer expires. This embodiment is designed for intra-DeNB handover, where the upstream traffic is transmitted via the same DeNB before and after the handover. Therefore, the upstream traffic is visible to the DeNB and the DeNB internal logic can avoid the out-of sequence delivery of upstream user traffic to the S-GW.

Figure 6:
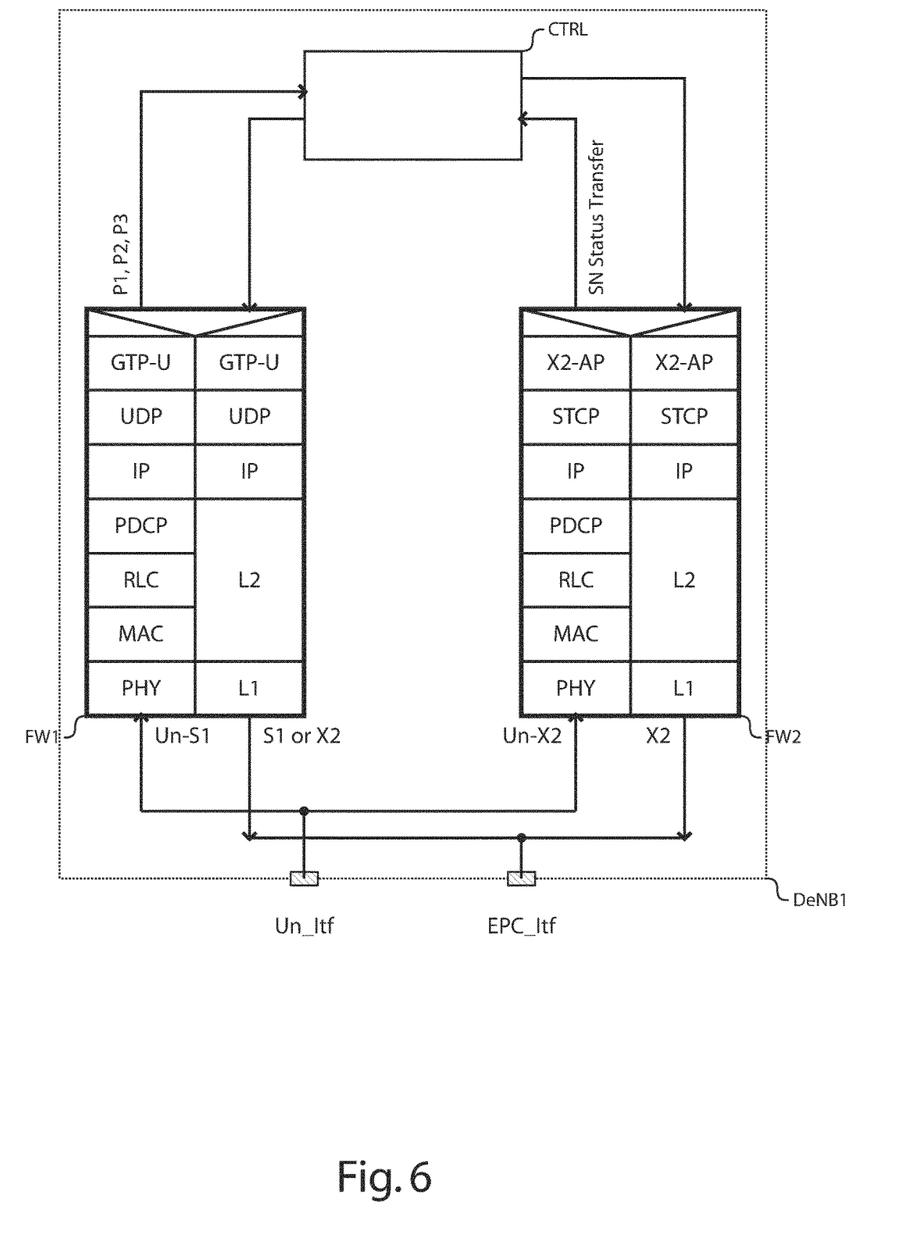
FIG. 6 represents an embodiment of a DeNB according to the invention.

There is seen in FIG. 6 further details about the DeNB DeNB1 with regard to the invention.

The DeNB DeNB1 comprises as most noticeable functional blocks:
- a first forwarding means FW1 for proxying upstream data traffic between the source RN RN1 and the S-GW S-GW1,
- a second forwarding means FW2 for proxying upstream signaling between the source RN RN1 and the target eNB eNB2,
- a forwarding controller CTRL for controlling the forwarding of the SN STATUS TRANSFER message to the target eNB eNB2 in dependence of the forwarding of pending upstream data packets to the S-GW S-GW1, if any,
- a first wireless interface Un_Itf for transmission, respectively reception, of control and user data to, respectively from, the RN RN1,
- a second wired interface EPC_Itf for transmission, respectively reception, of control and user data to, respectively from, the EPC.

The forwarding controller CTRL is coupled to the first forwarding means FW1 and to the second forwarding means FW2. The first forwarding means FW1 and the second forwarding means FW2 are coupled to both the wireless interface Un_Itf and the wired interface EPCP_Itf.

The first forwarding means FW1 accommodates two protocol stacks inter-connected at a specific protocol layer through the forwarding controller CTRL. Upstream data packets received over the Un_Itf interface (Un-S1) are dispatched towards a first protocol stack for further decoding up to a certain protocol layer, and are conditionally relayed by the forwarding controller CTRL towards a second peer protocol stack for further encoding and transmission through the EPC_Itf interface towards the S-GW S-GW1 (S1) or the target eNB eNB2 (X2).

The first protocol stack, through which upstream data packets are gradually decoded, comprises the following protocol layers:
- a PHYsical (PHY) layer,
- a Medium Access Control (MAC) layer,
- an RLC layer,
- a PDCP layer,
- an Internet Protocol (IP) routing layer,
- a User Datagram Protocol (UDP) transport layer, and
- a GTP-U tunneling layer.

The GTP-U payload comprises IP datagrams exchanged between two application, such as between a client application at subscriber side and a server application at network side.

This payload, together with further control information such as the PDCP SN used over the Uu interface as decoded from the GTP-U extension header, are forwarded to the forwarding controller CTRL for further handling.

The second peer protocol stack, through which upstream data packets are gradually encoded, comprises the following layers:
- a L1 physical layer and a L2 access layer as used over the EPC,
- an IP routing layer,
- a UDP transport layer, and
- a GTP-U tunneling layer.

The second forwarding means FW2 accommodates two protocol stacks inter-connected at a specific protocol layer through the forwarding controller CTRL. Upstream control packets received over the Un_Itf interface (Un-X2) are dispatched towards a third protocol stack for further decoding up to a certain protocol layer, and are conditionally relayed by the forwarding controller CTRL towards a fourth peer protocol stack for further encoding and transmission through the EPC_Itf interface towards the target eNB eNB2 (X2).

The third protocol stack, through which upstream control packets are gradually decoded, comprises the following protocol layers:
- a PHY layer,
- a MAC layer,
- an RLC layer,
- a PDCP layer,
- an IP routing layer,
- a Stream Control Transmission Protocol (SCTP) transport layer, and
- a X2-APplication (X2-AP) application layer.

The X2-AP payload, including the SN STATUS TRANSFER message issued by the RN RN1, is forwarded to the forwarding controller CTRL for further handling.

The fourth peer protocol stack, through which upstream control packets are gradually encoded, comprises the following protocol layers:
- a L1 physical layer and a L2 access layer used over the EPC,
- an IP routing layer,
- a STCP transport layer, and
- a X2-AP application layer.

The forwarding controller CTRL closely controls the forwarding of an SN STATUS TRANSFER message to a target eNB in dependence of the forwarding of any pending upstream data packets that have not been validly delivered to the S-GW S-GW1 for the corresponding E-RAB(s), or vice-versa.

The forwarding controller CTRL behaves according to any of the aforementioned solutions so as to guarantee that the upstream data packets are delivered in-sequence to the S-GW S-GW1 during a handover procedure.

According to the first solution, the forwarding controller CTRL buffers the SN STATUS TRANSFER message issued by the RN RN1 and received through the third protocol stack, and thereupon starts a pre-configured timer. When the timer expires, the forwarding controller CTRL sends the SN STATUS TRANSFER message to the fourth protocol stack for encoding and transmission to the target eNB eNB2. Thereafter, the forwarding controller CTRL discards any pending upstream data packets received through the first protocol stack for the corresponding E-RAB(s), that is to say the pending upstream data packets are not relayed towards the second peer protocol stack.

According to the second solution, the forwarding controller CTRL buffers the SN STATUS TRANSFER message issued by the RN RN1 and received through the third protocol stack, and decodes the upstream PDCP SN encoded into the SN STATUS TRANSFER message for the respective E-RAB(s). Then, the forwarding controller CTRL monitors the delivery of any pending upstream data packets received through the first protocol stack for the corresponding E-RAB(s) up to (not including) that PDCP SN by decoding the PDCP SN encoded into the GTP-U extension header of the relayed upstream data packets. When all the pending upstream data packets have been validly delivered to the S-GW S-GW1, then the forwarding controller CTRL sends the SN STATUS TRANSFER message to the fourth protocol stack for encoding and transmission to the target eNB eNB2.

According to the third solution, the forwarding controller CTRL decodes the upstream PDCP SN encoded into the SN STATUS TRANSFER message for the respective E-RAB(s), and forwards the SN STATUS TRANSFER message issued by the RN RN1 and received through the third protocol stack without delay to the fourth protocol stack for further encoding and transmission towards the target eNB eNB2. However, the forwarding controller CTRL redirects any pending upstream data packets received through the first protocol stack for the corresponding E-RAB(s) towards another GTP-U tunnel that is used for conveying upstream user data to the target eNB eNB2. Optionally, the forwarding controller CTRL may update, for each E-RAB(s), the upstream PDCP SN as encoded into the SN STATUS TRANSFER message according to the last upstream data packet that has been actually delivered to the SGW S-GW1 for that E-RAB.

Note that not all the upstream data or signaling packets need to go through the forwarding controller CTRL. For instance, a dispatcher may pick up SN STATUS TRANSFER messages for further processing by the forwarding controller CTRL, while passing other signaling messages transparently to the peer protocol stack. Similarly, upstream data packets are forwarded to the forwarding controller CTRL only for the UE(s) for which an outbound handover is on-going, e.g. only for the E-RAB(s) for which a corresponding SN STATUS TRANSFER message has been received.

Note also that the target eNB may be a RN operated by the same or another DeNB.

Although the above description has made exhaustive references to LTE technology and terminology, the radio access nodes, mobility management nodes and serving gateway may operate in accordance with further mobile or wireless communication technologies that are deemed to support relay nodes proxied through donor nodes.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. A donor radio access node configured to wirelessly connect to, and to proxy operation of, a source relay node, and further configured to forward upstream user traffic towards a serving gateway during a handover of a particular mobile device from a source cell operated by said source relay node to a target cell operated by a target radio access node, said donor radio access node comprising:
   a first transmitter configured to forward a sequence of upstream data packets from said source relay node to said serving gateway, the sequence of upstream data packets comprising upstream data packets up to a particular packet sequence number;
   a second transmitter configured to forward a data transfer status message for said particular mobile device from said source relay node to said target radio access node, the data transfer status message comprising an information element indicative of said particular packet sequence number,
   wherein said donor radio access node comprises a forwarding controller coupled to said first and second transmitters, and configured to interdependently control forwarding of said data transfer status message and of at least one pending upstream data packet out of said sequence of upstream data packets that has not been yet validly forwarded to said serving gateway upon receipt of said data transfer status message and wherein said forwarding controller is further configured to delay forwarding of said data transfer status message to said target radio access node till said pending upstream data packet has been validly forwarded to said serving gateway or till a predetermined period of time has expired.

2. A donor radio access node according to claim 1, wherein said forwarding controller is further configured to stop forwarding at least one still pending upstream data packet to said serving gateway after said pre-determined period of time has expired.

3. A donor radio access node according to claim 1, wherein said forwarding controller is further configured to redirect at least one still pending upstream data packet to said target radio access node after said data transfer status message has been validly forwarded to said target radio access node.

4. A method for forwarding upstream user traffic towards a serving gateway during a handover of a particular mobile device from a source cell operated by a source relay node to a target cell operated by a target radio access node, said method comprising, by a donor radio access node configured to wirelessly connect to, and to proxy operation of, said source relay node:
   forwarding a sequence of upstream data packets from said source relay node to said serving gateway, the sequence of upstream data packets comprising upstream data packets up to a particular packet sequence number;
   forwarding a data transfer status message for said particular mobile device from said source relay node to said target radio access node, the data transfer status message comprising an information element indicative of said particular packet sequence number,
   wherein said method further comprises, by said donor radio access node, interdependently controlling forwarding of said data transfer status message and of at least one pending upstream data packet out of said sequence of upstream data packets that has not been yet validly forwarded to said serving gateway upon receipt of said data transfer status message,
   and wherein said interdependently controlling comprise delaying forwarding of said data transfer status message to said target radio access node till said at least one pending upstream data packet has been validly forwarded to said serving gateway or till a predetermined period of time has expired.

5. A method according to claim 4, wherein said method further comprises, by said donor radio access node,
   stopping forwarding at least one still pending upstream data packet to said serving gateway after said pre-determined period of time has expired.

6. A method according to claim 4, wherein said method further comprises, by said donor radio access node, redirecting at least one still pending upstream data packet to said target radio access node after said data transfer status message has been validly forwarded to said target radio access node.

* * * * *